J. Urmy.
Mower.
No. 882. Reissued Jan. 3. 1860.
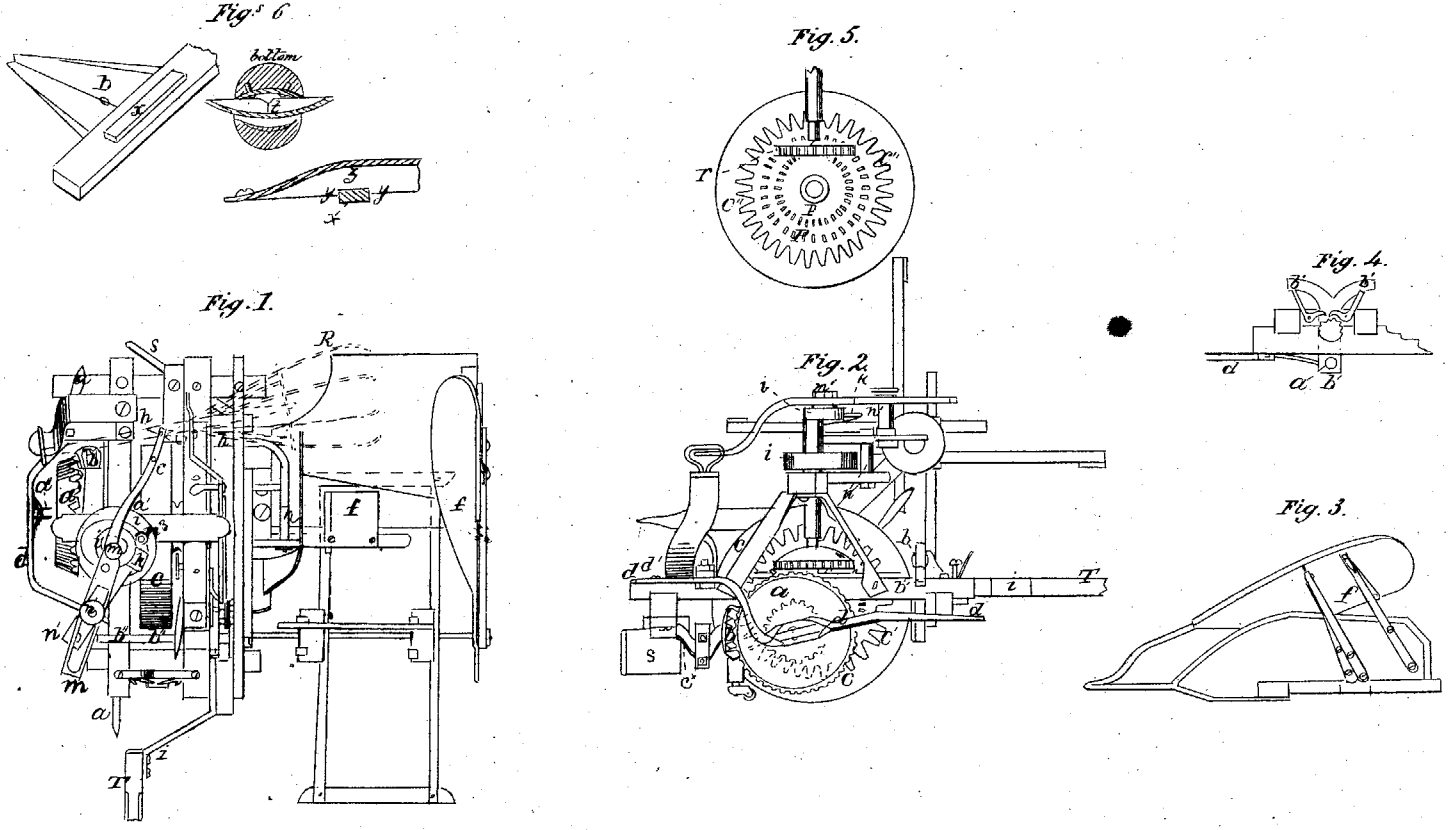
Witnesses
J. Cohen
E. H. Smith
N. B. Stoughton
Atty for Jesse Urmy

UNITED STATES PATENT OFFICE.

JESSE URMY, OF WILMINGTON, DELAWARE.

IMPROVEMENT IN GRAIN AND GRASS HARVESTERS.

Specification forming part of Letters Patent No. 13,530, dated July 24, 1855; Reissue No. 882, dated January 3, 1860.

DIVISION A.

*To all whom it may concern:*

Be it known that I, JESSE URMY, of Wilmington, in the county of New Castle and State of Delaware, have invented certain Improvements in Grain and Grass Harvesters; and I do hereby declare that the following is a full, clear, and exact description of the principle or character which distinguishes it from all other things before known, and of the usual manner of making, modifying, and using the same, reference being had to the accompanying drawings, of which—

Figure 1 represents a plan of my reaper and mower; Fig. 2, a side view showing the gearing, &c.; Fig. 3, a side view of my parting-board; Fig. 4, a front view of the dogs *b b;* Fig. 5, the gearing, and shows the mode of adjustment; Fig. 6, a perspective section and side view of the cutting arrangement.

My invention consists in certain improvements in machines for reaping and mowing, hereinafter described, as follows: In this machine the reciprocating motion is given to the cutter-bar by means of a rod, *h*, which, on one end being fastened to the cutter-bar, thence reaches back and round the driving-wheel *c*, where its other end connects with a crank, *c'*. This crank is fast on the axis of bevel-wheel *b*, which gears into bevel-wheel *a*. This axis *a' a'* of this last bevel-wheel *a* carries on its inner end a cog-wheel, which gears into the cogs *c''* inside the driving-wheel *c*. By these means the revolution of the driving-wheel will revolve the bevel-wheels and the crank *c'*, and impart the required reciprocating motion to the cutter-bar. The outer end of axis *a' a'* is supported by a crank-lever, *d*, which is pivoted to the frame *d'* in rear of the driving-wheel and bevel-gearing, the front end of said crank-lever reaching underneath the driver's seat, where it is pivoted to the lowest arm of a three-armed lever, *b' b' b'*. The fulcrum of this three-armed lever is about in its center, and the driver, by pressing his foot on the one or the other of the upper two arms of lever *b' b'*, causes the lever-arm to describe a semicircular way round its fulcrum, thereby moving in or out of the front end of crank-lever *d*, and with it of course the central part of said crank-lever *d*, which carries the outer end of axle *a' a'*. By these means the bevel-wheel *a* can be brought into or out of gearing with the bevel-wheel *b*, thereby either causing or stopping the motion of the cutter-bar. The arrangement of the gearing and crank *d* outside of the driving-wheel allows the driving-wheel to be placed at its proper distance from the cutting machinery, so that when coming round it will just run in the track previously made by the dividing-board $f^{\times}$ instead of on the cut grain.

The tongue T is placed about in a line with the driving-wheel, so as to allow the horses to walk on the side of the standing grass, and it is attached to the part of the frame nearest to the cutting machinery by means of a bent bar, *i'*, in order to prevent side draft.

Another feature of the machine consists in the arrangement of the rake R. The rake is attached to the rear end of a horizontal rod, *m*, which is pivoted in *m'* to an eccentric, *i*. The front end of rod *m* has a slot in which plays a pin, *h'*, which extends upward from a slot in a secondary horizontal rod, *n*. This rod *n* is pivoted to the frame about in its center in *n''*, and its end $n^3$, opposite to the end which carries pin *n'*, is provided with a friction-roller which plays in the groove of an eccentric, *i*, below the eccentric above mentioned. The revolution of the double eccentric *i i*, in combination with the said arrangement of the adjustable rods *m* and *n*, imparts to the rake its proper motion. An adjustable plate, *k*, serves to increase or decrease the eccentricity of the upper eccentric, *i*, thereby giving the rake more or less range of action. The vertical axes of the double eccentric *i i* is revolved by means of a pinion, *r*, which can be properly elevated or depressed, so as to make it gear into either one of the concentric sets of cogs *p p* on the inner face of the driving-wheel, thereby augmenting or diminishing the velocity of the motion of the rake. In rear of the driving-wheel, and on the outer side of the rake, there is hinged to the frame a guard-board, *s*, which is to prevent the grass from being thrown round by the rake under the driving-wheel.

The dividing-board *f* is horizontally hinged, so that its inner edge can be more or less turned from a vertical toward a horizontal position, thereby gathering the grain or grass more or less closely. There is fastened to this vibrating cutter-bar a plate, *f'*, the rear part of which lies flat and slides on the finger-board in order to keep the same clear. The upper sides of the finger-slots are provided with concave bed-plates *w*, their concave sides being placed toward the knives. The knives *t* are also curved instead of being flat, and their concave surfaces are placed toward the concaves of the bed-plate *w*. Knives and bed-plates are on their edges in close contact, so that they will continually sharpen each other. The bed-plates are adjustable so as to make up for the wearing of the plates and knives, and to keep them always in proper contact. These bed-plates *w* are shoe-pieces of steel, which may be taken out and sharpened or adjusted when necessary. The concave guard *z*, in its rear of the bed-plates, has projecting guides *y y*, between which passes projecting plate *x* upon the rear of the knives *t*, for the purpose of clearing out the grass and dirt which may lodge there.

What I claim as my improvements in reapers and mowers is—

1. In combination with the driving-wheel placed inside the gearing, as above described, the angular tongue *i* for preventing side draft, and at the same time allowing the horses to walk on the side of the standing grass or grain.

2. The above-described use of the balanced dogs *b b* under the driver's feet, for throwing the cutting apparatus in and out of gear.

3. Making the parting and gathering board *f* hinged and adjustable, as set forth.

4. Regulating the size of the sheaves by means of the several ranges of gearing *p p* within the driving-wheel, in combination with the adjustable pinion *r*, as set forth.

JESSE URMY.

Witnesses:
A. B. STOUGHTON,
E. COHEN.